UNITED STATES PATENT OFFICE.

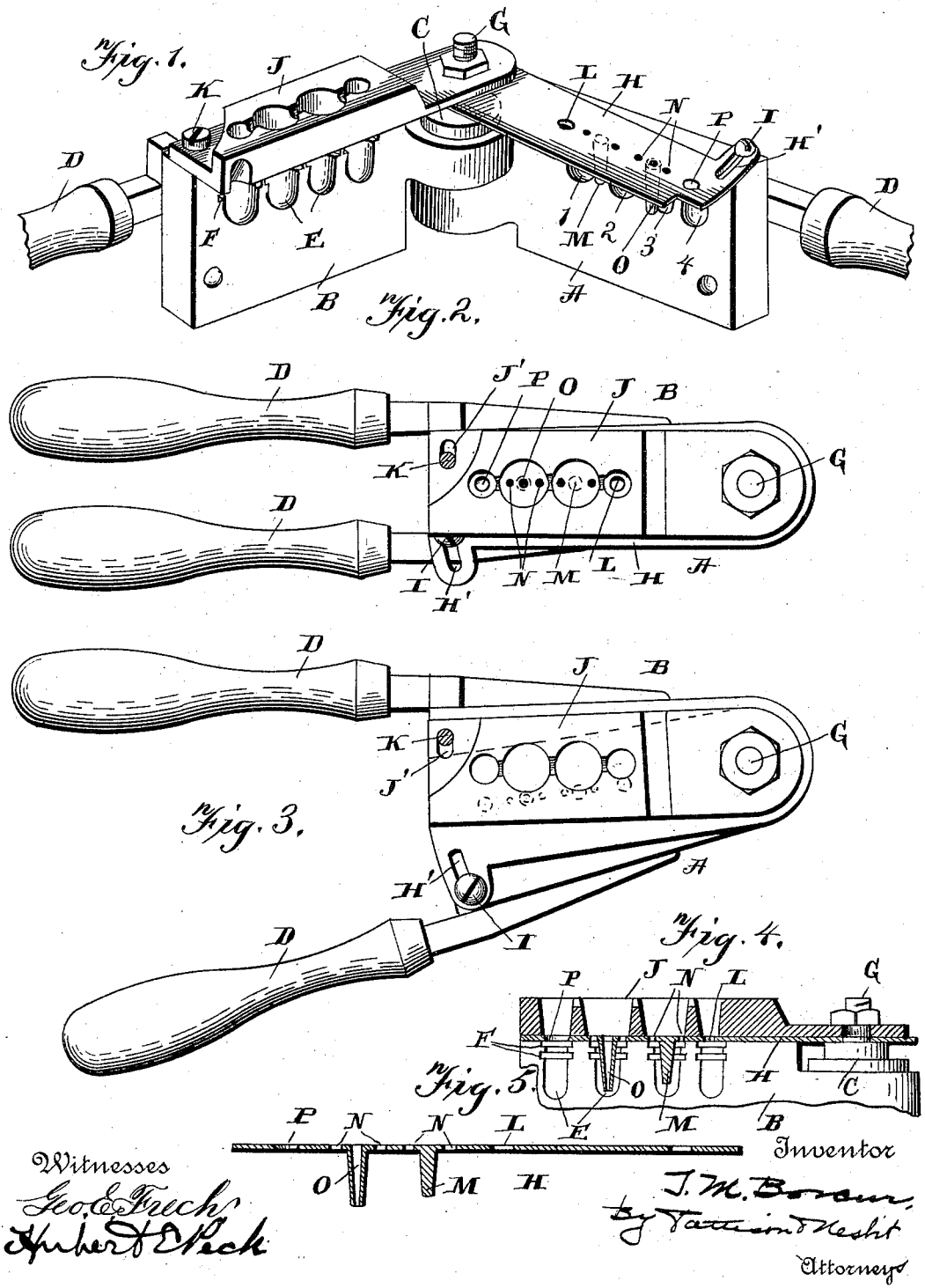

TYORLZ M. BORCUR, OF DODGE CITY, KANSAS.

BULLET-MOLD.

SPECIFICATION forming part of Letters Patent No. 598,355, dated February 1, 1898.

Application filed February 13, 1897. Serial No. 623,248. (No model.)

*To all whom it may concern:*

Be it known that I, TYORLZ M. BORCUR, of Dodge City, in the county of Ford and State of Kansas, have invented certain new and useful Improvements in Bullet-Molds; and I do hereby declare the following to be a full, clear, and exact description of the invention, such as will enable others skilled in the art to which it pertains to make and use it, reference being had to the accompanying drawings, which form part of this specification.

This invention relates to bullet-molds; and the object is to provide a two-part mold with improved ejecting mechanism, whereby the hold of the bullet upon either side of the mold is released upon separating the sides or mold parts.

The invention also includes a cut-off plate of improved form.

The invention consists in the novel features of construction hereinafter fully described and claimed, and illustrated by the accompanying drawings, in which—

Figure 1 is a perspective view of the mold when open. Fig. 2 is a plan view of the same when closed. Fig. 3 is a similar view, the mold parts being slightly separated. Figs. 5 and 4 are detail views of the sprue-holder and cut-off plate, respectively.

A designates the right hand, and B the left hand, portion of the two-part mold-body, the parts being united by pivot C, and each having a handle D.

E designates the bullet-molding cavities, and F the grooves therein to form the usual ribs on the surfaces of the finished bullets. Post G projects centrally from pivot C, and mounted to turn thereon is cut-off plate H, the plate extending over mold member A and formed at its free end with arc slot H', through which screw I extends into the mold member, thus limiting the independent lateral movement or swing of said plate to the extent of the slot. Sprue-holder J is also centered on post G, being arranged immediately above plate H and extending backward over mold member B and formed with slight arc slot J', which affords the sprue-holder slight independent lateral movement on screw K, projecting from mold member B.

The openings in the sprue-holder and cut-off plate aline with the bullet-forming cavities when parts A and B are closed together, the molten lead being then poured through holder J and down through the openings in the cut-off until the molds are full and the lead backs up in the sprue-holder. Thus the molds, cut-off, and sprue-holder are united by the several masses of lead, one for each bullet formed. Mold parts A and B are then separated by the handles, with the result that the right-hand portion A moves away from the bullets, with screw I traversing slot H', and when the limit of this movement is reached the cut-off plate and sprue-holder J are given unitary lateral movement to the extent of small arc slot J', the movement being sufficient, however, to loosen the bullets from mold portion B. The separating movement continuing after the sprue-holder has reached the limit of its movement, the cut-off plate is swung laterally beneath the said holder, with the result that the bullets are severed from the sprues and drop freely from the mold, or if the mold part B first separates from the bullets then sprue-holder J will first swing laterally as far as screw K and slot J' will permit. Then mold part A will separate from the bullets, after which the cutting will take place, as above described. Thus it will be seen that the bullets are automatically ejected from their respective molds before they are severed from their sprues, and this regardless of which mold-section first leaves or moves away from the bullets.

The cut-off plate is shown adapted to form four different styles of bullets. For mold No. 1 the plate is simply formed with a circular non-beveled opening L, so that the bullet formed in this mold will have on its base a circular nib or projection, the depth of the same corresponding with the thickness of the plate. For mold No. 2 the plate carries a solid core M, which depends centrally in the mold, and on either side of the core are the filling-openings N, the same being preferably arranged in line parallel with the longitudinal extent of the plate, so that the bullet formed by this mold will have a hollow center and two end nibs corresponding with the filling-openings. The arrangement for mold No. 3 is the same as for No. 2, with the single exception that the core O is hollow, being open at both ends, so that the bullet is formed with a central core part. The opening in the cut-off plate for mold No. 4 is the same as for mold No. 1, excepting that the top of the plate around the opening is beveled to form a circular cutting edge, as indicated at P, so that the bullet end will be cut smooth with no projection or nib. The bevel of the plate acts as a wedge to lift or raise the sprue in the holder while it is being severed from the bullet, so that a clean cut is made by the lower edge of the cut-off plate and no projection is left on the end of the bullet. The projections or nibs, however, are so small as not to be objectionable, but if not desired may be readily cut off. The filling-opening or openings and core, if one be used, would be uniform throughout each cut-off plate, so that bullets of uniform kind may be turned out. Plates may be provided for the different forms of bullets, as desired, the same being readily secured to and removed from the mold. The several forms are here illustrated on one plate simply for the sake of convenience. The openings in the sprue-holder are preferably of tapering form, so that the sprues may be readily removed.

For casting smooth bullets and bullets having very shallow grooves the sprue-holder may be made rigid with the mold-section either by tightening screw K, so as to clamp the holder in place, or for the purpose slot J' may be displaced by simply a screw-opening. In casting bullets having grooves of any considerable depth, however, it is desirable that the sprue-holder be adapted to move as described, for without such movement the cut-off plate is liable to simply sever the bullets from the sprues without displacing the bullets from the molds. My preferred arrangement is, with the said holder, afforded sufficient lateral movement or swing to dislodge the bullets from the mold-section carrying the sprue-holder, so that the dislodging or ejecting is complete before the bullets and sprues are severed.

I am aware that it has been proposed heretofore to provide a two-part mold with a cut-off, the latter being centered on the mold-hinge and at its free end formed with an arc slot and a movement-limiting screw whereby the cutter has lateral play independent of the mold-sections, and I make no claim to such construction.

Having thus fully described my invention, what I claim as new, and desire to secure by Letters Patent, is—

1. A mold formed in halves movable toward and away from each other, a sprue-holder above the mold and movable with one of the mold-sections, and a cutter between the sprue-holder and mold and movable with the other mold-section, substantially as shown and described.

2. A mold formed into separable halves, a sprue-holder above the mold and having limited lateral movement on one of the mold-halves, and a cutter between the sprue-holder and mold and having limited lateral movement on the other mold-half, substantially as shown and described.

3. A mold formed in two halves movable toward and away from each other, a sprue-holder above the mold and movable with one of the halves and having slight lateral movement independent of said half-mold, and a cutter between the sprue-holder and mold and mounted on and movable with the other half-mold and also having slight lateral movement independent of the mold-half carrying it, the independent lateral movement of the cutter being greater than the corresponding movement of the sprue-holder, substantially as shown and described.

4. The combination of half-mold sections pivoted together at one end, a sprue-holder and a cutter pivoted concentrically with the mold-sections and arranged thereover—the cutter operating between the mold and sprue-holder, and means for securing the sprue-holder and cutter, respectively, to opposite halves of the mold, substantially as shown and described.

5. The combination of the half-mold sections hinged together at one end, a cutter and sprue-holder arranged in succession over the mold and pivoted to turn concentrically with the mold parts, the holder and cutter being slotted, and screws in said slots for loosely securing them, respectively, to the mold-sections, substantially as shown and described.

6. The combination of a mold, a sprue-holder, a cut-off plate adapted to operate between the holder and mold, and a core part carried by the cutter and adapted to extend into the mold, substantially as shown and described.

In testimony whereof I affix my signature in presence of two witnesses.

TYORLZ M. BORCUR.

Witnesses:
J. H. LEIDIGH,
E. M. MESNIR.